US008525065B2

(12) United States Patent
Watanabe et al.

(10) Patent No.: US 8,525,065 B2
(45) Date of Patent: Sep. 3, 2013

(54) ELECTRIC DISCHARGE MACHINING APPARATUS AND PROGRAMMING DEVICE

(75) Inventors: Kohtaroh Watanabe, Tokyo (JP); Rika Obata, Tokyo (JP); Tatsuya Katou, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 506 days.

(21) Appl. No.: 12/744,432

(22) PCT Filed: Nov. 29, 2007

(86) PCT No.: PCT/JP2007/073016
§ 371 (c)(1),
(2), (4) Date: Jul. 2, 2010

(87) PCT Pub. No.: WO2009/069207
PCT Pub. Date: Jun. 4, 2009

(65) Prior Publication Data
US 2010/0264119 A1    Oct. 21, 2010

(51) Int. Cl.
B23H 1/00    (2006.01)
(52) U.S. Cl.
USPC .................................. 219/69.15; 219/69.17
(58) Field of Classification Search
None
See application file for complete search history.

(56) References Cited

U.S. PATENT DOCUMENTS 2,813,966 A * 11/1957 Matulaitis .................. 219/69.15
5,200,591 A * 4/1993 Ooba ......................... 219/69.17
5,742,018 A * 4/1998 Akemura .................... 219/69.13
6,314,336 B1 * 11/2001 Sugiyama et al. ........... 700/174
6,721,621 B1 * 4/2004 Naka et al. .................. 700/162

(Continued)

FOREIGN PATENT DOCUMENTS

JP          61-5528 U    1/1986
JP        11-188530 A    7/1999

(Continued)

OTHER PUBLICATIONS

Supplementary Examination Guidelines for Determining Compliance With 35 U.S.C. 112 and for Treatment of Related Issues in Patent ApplicationsFederal Register / vol. 76, No. 27 / Wednesday, Feb. 9, 2011 / Notices, 14 pgs.*
International Search Report corresponding to PCT/JP 2007-073016 dated Jan. 8, 2008.

*Primary Examiner* — David E Graybill
(74) *Attorney, Agent, or Firm* — Sughrue Mion, PLLC

(57) ABSTRACT

An electric discharge apparatus includes electrode specification input means for inputting each electrode specification of a plurality of integral electrode where electrodes corresponding to a plurality of machining forms are arranged continuously on the same axis, machining detail input means for inputting data of a workpiece when electric discharge machining is performed using the integral electrode, and a machining program generation means for generating a machining program consisting of machining start position and a machining depth when electric discharge machining is performed using each electrodes based on the electrode specification and the thickness data of the workpiece thus input. There are further provided electrode specification input means and the machining detailed input means capable of inputting thereinto the following information: which part of the integral electrodes acts for rough machining and which part acts for finish machining, whether a finishing electrode is provided at one position or two positions, in what position relation they are, and how much the thickness of the workpiece is. Therefore, manual calculation by a worker is not required and a program can be made automatically only by inputting these parameters.

7 Claims, 9 Drawing Sheets

(56) References Cited

U.S. PATENT DOCUMENTS

| | | | |
|---|---|---|---|
| 6,888,087 B2* | 5/2005 | Takeyama | 219/69.12 |
| 7,286,898 B2* | 10/2007 | Parmenter et al. | 700/182 |
| 7,322,083 B2* | 1/2008 | Parmenter et al. | 29/33 P |
| 2001/0001841 A1* | 5/2001 | Sugiyama et al. | 700/192 |
| 2006/0065546 A1* | 3/2006 | Curodeau | 205/640 |
| 2007/0051701 A1* | 3/2007 | Ogata et al. | 219/69.17 |
| 2010/0264119 A1* | 10/2010 | Watanabe et al. | 219/69.17 |

FOREIGN PATENT DOCUMENTS

| | | |
|---|---|---|
| JP | 11-188530 A | 7/1999 |
| JP | 11-207530 A | 8/1999 |
| JP | 2000126937 A | 5/2000 |
| JP | 2001084017 A | 3/2001 |
| JP | 2002307241 A | 10/2002 |
| JP | 2003-291033 A | 10/2003 |
| JP | 2004-142084 A | 5/2004 |

* cited by examiner

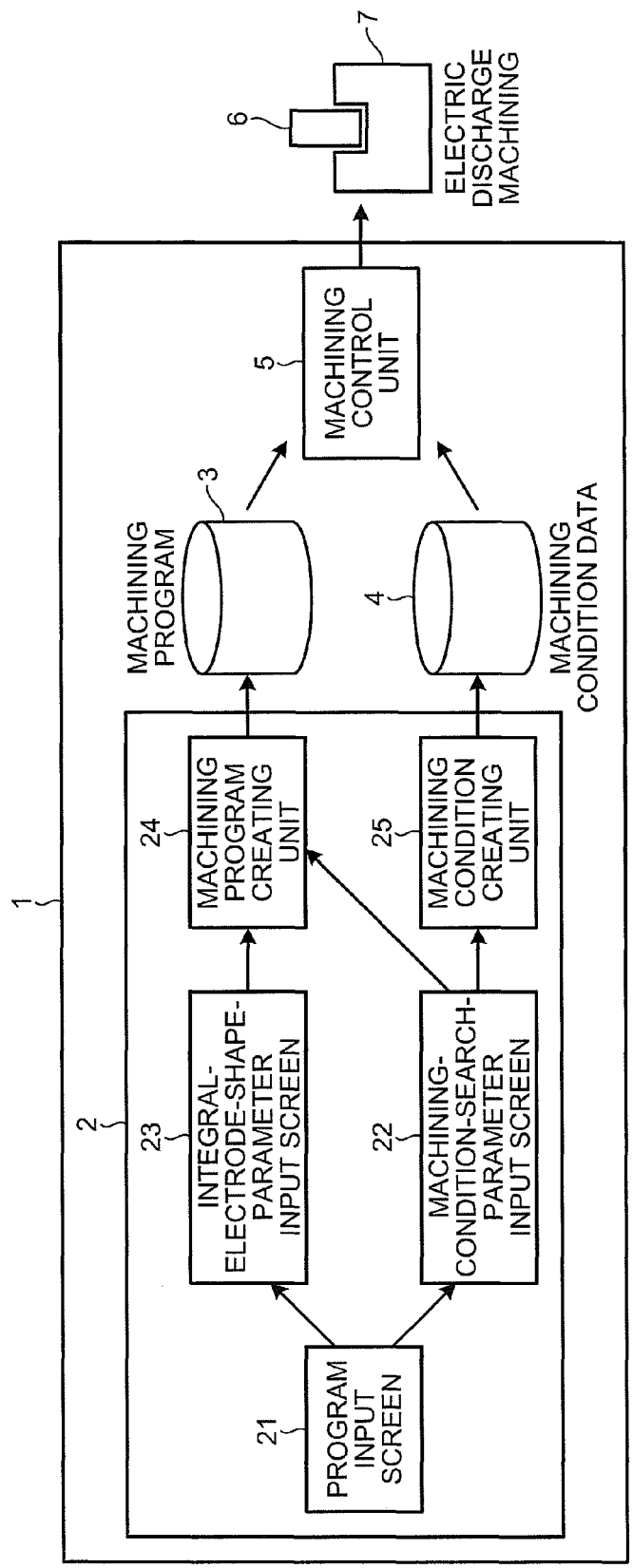

FIG.2A

| MACHINING CONDITION SEARCH | | | | | ☒ |
|---|---|---|---|---|---|
| MACHINING CONDITION | DETAIL | ADJUSTMENT | | | |
| SHAPE PATTERN | SCREW-PENETRATION | M9000-9099 | AVAILABLE | M PACK NUMBER | 9000 |
| | INTEGRAL ELECTRODE | WORK NUMBER | W01 | SEARCH COMPLETED | |

PLEASE INPUT OUTER DIAMETER (APPROXIMATE) OF MACHINED HOLE AFTER MACHINING.

MACHINING CONTENT

| | | |
|---|---|---|
| PENETRATION ▼ | WORK MATERIAL | St ▼ |
| | ELECTRODE MATERIAL | Cu ▼ |
| | WORK PLATE THICKNESS | 10.000 mm |
| | SCREW OUTER DIAMETER | 12.000 mm |
| | MACHINED LATERAL AREA | 0.00 mm² |
| | PRIORITY | STANDARD ▼ |

MACHINING SETTING

| | | | | |
|---|---|---|---|---|
| SURFACE QUALITY | MATTE ▼ | | BITE CONTROL | YES ▼ |
| SURFACE ROUGHNESS Rz | 6 ▼ μm | | TAPER ANGLE | 0.0000 |
| LIQUID TREATMENT | NO JETTING ▼ | | ROCKING PATTERN | ⊙ ARC ▼ |
| SHAPE DETAIL | STANDARD ▼ | | PATTERN No. | 200 |

REDUCTION MARGIN

| | 1ST | 2ND | 3RD | 4TH | 5TH | 6TH |
|---|---|---|---|---|---|---|
| mm/side | 0.200 | 0.100 | 0.100 | | | |

MACHINING DETAIL

| PILOT HOLE DIAMETER | 8.500 mm |
|---|---|

MACHINING-CONDITION-SEARCH-PARAMETER INPUT SCREEN

FIG.2B

| MACHINING CONDITION SEARCH | | | | | ☒ |
|---|---|---|---|---|---|
| MACHINING CONDITION | DETAIL | ADJUSTMENT | | | |
| SHAPE PATTERN | SCREW- PENETRATION | M9000-9099 | AVAILABLE | M PACK NUMBER | 9000 |
| | INTEGRAL ELECTRODE | WORK NUMBER | W01 | SEARCH COMPLETED | |

PLEASE INPUT OUTER DIAMETER (APPROXIMATE) OF MACHINED HOLE AFTER MACHINING.

INTEGRAL ELECTRODE

T

| | | |
|---|---|---|
| No.6 | | mm/side |
| No.5 | | mm/side |
| No.4 | | mm/side |
| PITCH | 1.500 mm | No.3 0.100 mm/side |
| Z START POSITION | 5.000 mm | No.2 0.100 mm/side |
| 1ST MACHINING DEPTH | 15.000 mm | No.1 0.200 mm/side |
| PILOT HOLE DIAMETER | 85.00 mm | |
| WORK PLATE THICKNESS | 10.000 mm | |
| SCREW OUTER DIAMETER | 12.000 mm | |

☐ INCH SCREW THREAD

NUMBER OF THREADS

NUMBER OF THREADS PER INCH

START POSITION
X
Y
Z
C
MACHINING DEPTH
Z
X
Y
C

INTEGRAL-ELECTRODE-SHAPE-PARAMETER INPUT SCREEN

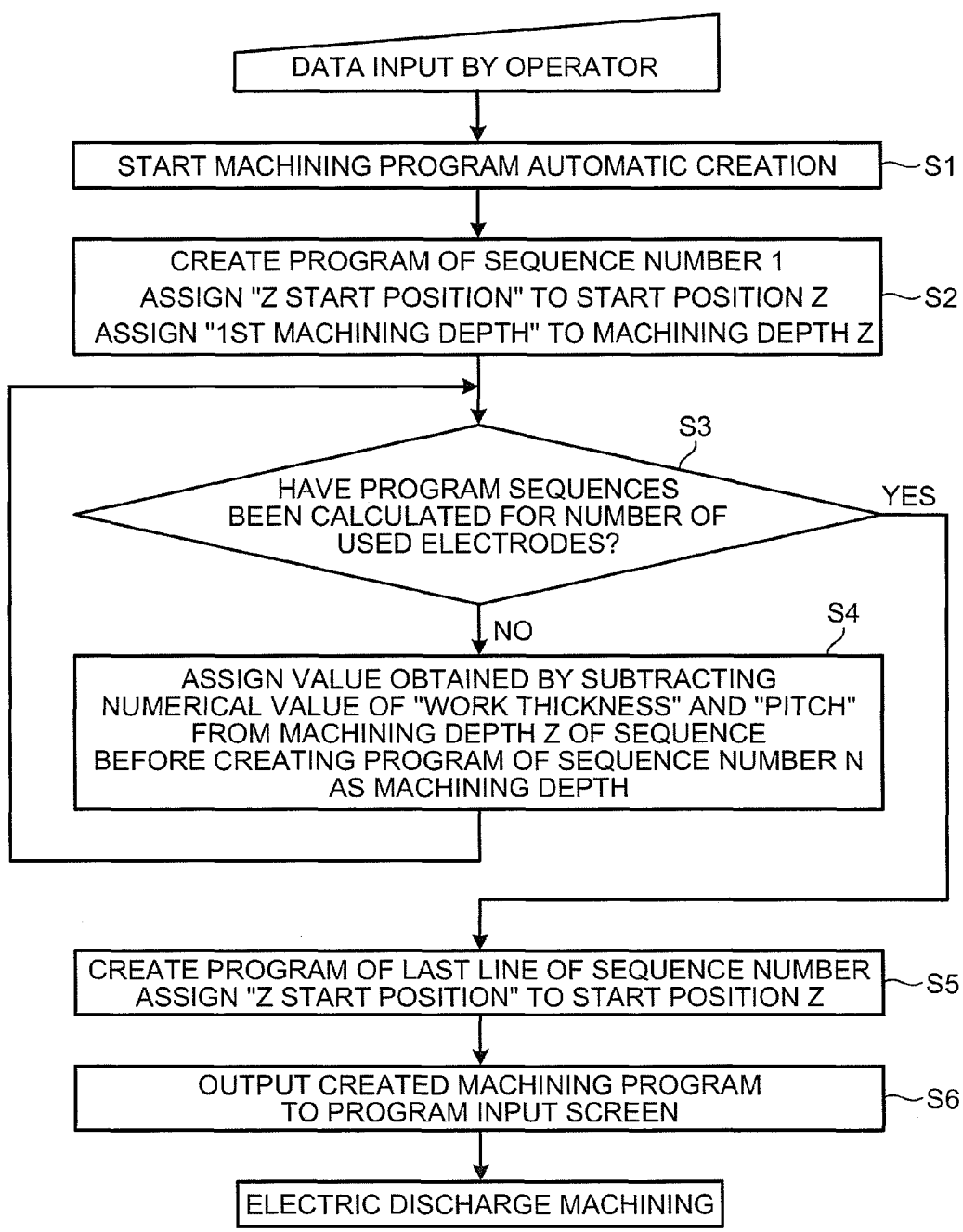

MACHINING-CONDITION-SEARCH-PARAMETER INPUT SCREEN

FIG.4B

| MACHINING CONDITION SEARCH | ☒ |
|---|---|

| MACHINING CONDITION | DETAIL | ADJUSTMENT |
|---|---|---|

| SHAPE PATTERN | HELICAL- PENETRATION (SWING DOWN) | M9000-9099 AVAILABLE M PACK NUMBER |
|---|---|---|
| | INTEGRAL ELECTRODE | WORK NUMBER | ○ SEARCH COMPLETED |

FINISHING 2) PLEASE INPUT Z HEIGHT OF ELECTRODE. WHEN THERE IS NO Z HEIGHT, THIS ITEM IS LEFT BLANK. WITH JIG

INTEGRAL ELECTRODE ▼          T  11

| 3RD ELECTRODE | 20.000 mm | 0.100 mm/side |
| RELIEF PORTION 2 | 12.000 mm | |
| 2ND ELECTRODE | 20.000 mm | 0.100 mm/side |
| RELIEF PORTION 1 | 12.000 mm | |
| 1ST ELECTRODE | 20.000 mm | 0.200 mm/side |
| START HEIGHT | 5.000 mm | |

☐ SET START HEIGHT POSITIONS ZC TO 0

| WORK PLATE THICKNESS | 10.000 mm |
| MACHINED HOLE DIAMETER | 28.000 mm | DebugPitchVal 241.681 |

| | | START POSITION | |
|---|---|---|---|
| PITCH | | X | |
| HELICAL ANGLE | 20.0000 | Y | |
| | | Z | 5.000 |
| ANGLE PER DEPTH | | C | 7.448 |
| | | MACHINING DEPTH | |
| | | Z | -94.000 |
| ROTATION DIRECTION | CW (RIGHT) | X | |
| | | Y | |
| | | C | -140.019 |

INTEGRAL-ELECTRODE-SHAPE-PARAMETER INPUT SCREEN

THREADING INTEGRAL ELECTRODE

HELICAL MILLING INTEGRAL ELECTRODE

FIG.7A

THREADING INTEGRAL ELECTRODE

| SEQUENCE NUMBER P | 1- | 2- | 3- | 4- |
|---|---|---|---|---|
| WORK NUMBER W | 1 | | | |
| START POSITION X | 0.000 | | | 0.000 |
| Y | 0.000 | | | 0.000 |
| Z | 5.000 | | | 5.000 |
| C | | | | |
| MACHINING DEPTH Z | -15.000 | -26.500 | -38.000 | |
| X | | | | |
| Y | | | | |
| C | | | | |
| MACHINING CONDITION E | 8001 | 8002 | 8003 | |
| ROCKING PATTERN D | 200 | 200 | 200 | |
| AUXILIARY CODE M | | | | |
| 1ST ELECTRODE T | 11 | 11 | 11 | |
| REDUCTION MARGIN R | 0.200 | 0.100 | 0.100 | |

FIG.7B

THREADING INTEGRAL ELECTRODE

| SEQUENCE NUMBER P | 1- | 2- | 3- | 4- |
|---|---|---|---|---|
| WORK NUMBER W | 1 | | | |
| START POSITION X | 0.000 | | | |
| Y | 0.000 | | | |
| Z | 5.000 | | | |
| C | 7.448 | | | |
| MACHINING DEPTH Z | -31.000 | -62.000 | -93.000 | 5.000 |
| X | | | | |
| Y | | | | |
| C | -29.781 | -77.457 | -125.133 | |
| MACHINING CONDITION E | 8001 | 8002 | 8003 | |
| ROCKING PATTERN D | 200 | 200 | 200 | |
| AUXILIARY CODE M | | | | 27 |
| 1ST ELECTRODE T | 11 | 11 | 11 | 11 |
| REDUCTION MARGIN R | 0.200 | 0.100 | 0.100 | 0.100 |

ELECTRIC DISCHARGE MACHINING APPARATUS AND PROGRAMMING DEVICE

TECHNICAL FIELD

This invention relates to a programming device that creates a machining program for performing electric discharge machining and an electric discharge machining apparatus that includes the device.

BACKGROUND ART

Conventionally, when extending through a work and performing threading and helical milling, electric discharge machining is performed by using an electrode in which an electrode for rough machining and an electrode for finish machining are coaxially arranged to be integrated as disclosed, for example, in Japanese Unexamined Utility Model Application Publication S61-5528.

For example, as an example of the integral electrode that coaxially includes the rough machining electrode and the finish machining electrode, one illustrated in FIG. 6 is present.

FIG. 6(a) illustrates an electrode for forming a through female screw by the electric discharge machining and a work, in which a pilot hole with a size for the electrode to enter is formed in the work and circular rocking machining is performed while gradually enlarging the pilot hole laterally in a state where the electrode is inserted into the pilot hole of the work to transfer the shape of the electrode, thereby forming the female screw inside the work. Then, after finishing this rough machining, the electrode is returned to a center position and is further moved in a Z direction by a constant amount, and then the electric discharge machining for the finish machining is performed again.
The third electric discharge machining is performed depending on the situation to repeat the finish machining for improving accuracy of the female screw in some cases.

FIG. 6(b) illustrates an electrode for forming a through helical-gear female mold by the electric discharge machining and a work, in which a pilot hole with a certain size is formed in the work and the electric discharge machining is performed while rotating the electrode by a constant rotation angle at the same time as the electrode is lowered in the Z direction to transfer the shape of the electrode, thereby forming the helical-gear female mold inside the work. Then, after finishing this rough machining, the electrode is lowered by a constant rotation angle in the Z direction without performing the electric discharge, and thereafter the electric discharge machining for the finish machining is performed again with the next electrode part. The third electric discharge machining is performed depending on the situation to repeat the finish machining for improving accuracy of the female mold in some cases.

In this manner, in the case of performing machining of extending through the work, there is a form in which each of coaxially-formed electrode parts individually performs the electric discharge machining in order, for example, as a rough machining electrode, a finish machining electrode 1, and a finishing machining electrode 2 to machine the work.

Patent document 1: Japanese Unexamined Utility Model Application Publication S61-5528 FIG. 3

DISCLOSURE OF INVENTION

Problem to be Solved by the Invention

In an electric discharge machining apparatus, the rough machining electrode and the finish machining electrode are generally manufactured separately as different parts and, when the electrode is changed, machining is typically performed after the electrode is positioned at the same position, and a method of programming is also considered on the premise thereof. Therefore, in the machining by using the integral electrode as described above, special considerations are not made in the conventional programming method for the electric discharge machining apparatus.

FIG. 7 illustrates, for example, a user input screen when creating a program for performing the threading and the helical milling shown in FIG. 6 by a conventional programming device.

FIG. 7(a) illustrates a case of machining the female screw, in which a column with a sequence number P of 1 indicates the rough machining, a column with the sequence number P of 2 indicates a first finish machining, a column with the sequence number P of 3 indicates a second finish machining, and a column with the sequence number P of 4 indicates an operation of returning the electrode to an original position to pull out the electrode from the work. A start position Z and a machining depth Z that are input in these columns are obtained by performing addition or subtraction of a work thickness, an each electrode thickness, and a length of a relief portion for one pitch between the electrodes and are input by an operator. Moreover, rows of a machining condition E, a rocking pattern D, and the like are machining conditions that are appropriately set by the operator.

Furthermore, FIG. 7(b) illustrates a case of machining the helical-gear female mold, in which columns with the sequence numbers P indicate machining processes such as roughing and finishing in the similar manner to FIG. 7(a). In the column with the sequence number P of 4, 27 is set to an auxiliary code M for avoiding a machining servo for returning the electrode to an original position from the work while reversely rotating the electrode without performing machining.
Start positions Z and C and machining depths Z and C that are input in these columns are obtained by performing addition, subtraction, or a trigonometric function calculation of information on a work thickness, an each electrode thickness, a length of a relief portion between the electrodes, and a helical angle and are input by the operator.

In this manner, when the operator creates the program for performing machining by using the integral electrode, the operator himself/herself needs to perform a geometric calculation while taking into account information such as which part of the coaxially-arranged electrodes is for the rough machining or the finish machining, whether the finishing electrode is provided at one location or two locations, in what positional relationship they are, and what the thickness of the work to be machined is, input the result thereof by keystroke, and perform programming while dividing the operation into a few lines, which leads to a problem that an error due to miscalculation, transcription error, or the like is easy to occur.

Specially, in a case where the integral electrode performs machining while performing a predetermined rotation around an axis of an electrode discharge machining electrode, the operator needs to determine an amount of rotation necessary for a program creation by performing a geometric calculation based on information such as a pitch, the helical angle, or a rotation angle per depth shown in the drawing, so that a programming efficiency is low.

In order to solve the above problem, the electric discharge machining apparatus according to this invention is configured such that a case of using the above integral electrode is also taken into account.

Specifically, a dedicated input screen is prepared, on which it is possible to input information such as which part of the integral electrode is for the rough machining or the finish machining, whether the finishing electrode is provided at one location or two locations, in what positional relationship they are, and what the thickness of the work to be machined is, and the program is easily created automatically simply by inputting parameters thereof.

Means for Solving Problem

A programming device of an electric discharge machining apparatus of the present invention includes an electrode specification input unit that inputs each electrode specification of an integral electrode in which electrodes corresponding to a plurality of machining forms are coaxially arranged continuously, a machining content input unit that inputs thickness data of a workpiece when performing electric discharge machining by using the integral electrode, and a machining program creating unit that creates a machining program including a machining start position and a machining depth when performing the electric discharge machining by using each of the electrodes based on these input electrode specification and thickness data of the workpiece.

Effect of the Invention

According to this invention, because the machining program for the integral electrode in which the electrodes corresponding to a plurality of machining forms are coaxially arranged continuously is automatically created in response to input of the actual electrode data and thickness of the work, it is possible to obtain effects that possibility of making an error by an operator due to miscalculation or the like can be eliminated and the time required for programming can be reduced.

BRIEF DESCRIPTION OF DRAWINGS

FIG. 1 is a schematic configuration diagram of an electric discharge machining apparatus according to a present embodiment.
FIG. 2 is a screen display example in a machining program creating device.
FIG. 3 is an operation flowchart in a machining program creating unit.
FIG. 7 is a machining program example in electric discharge machining by using the integral electrode.

BEST MODE(S) FOR CARRYING OUT THE INVENTION

First Embodiment

Figure 4A:
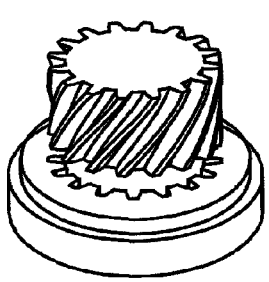
FIG. 4 is a screen display example in the machining program creating device.

FIG. 1 is a conceptual diagram illustrating a configuration of the first embodiment of the present invention, and particularly illustrates a schematic operation from a machining program creation to an electric discharge machining.
An electric discharge machining apparatus 1 performs the electric discharge machining by a machining control unit 5 performing a relative movement of an electrode 6 and a work 7, a machining energy supplying control, and the like based on a machining program 3 and machining condition data 4 created in an equipped machining program creating device 2.

A program input screen 21 for inputting a program from a keyboard is displayed on the machining program creating device 2, from which an operator can create the machining program 3 by keystroke in the similar manner to the conventional technology.
Moreover, on the machining program creating device 2 in the present embodiment, a machining-condition-search-parameter input screen 22 for inputting parameters for searching a database for a machining condition for performing desired machining and an integral-electrode-shape-parameter input screen 23 for inputting parameters of the integral electrode are prepared, which are dedicated screens prepared for each type of the electrodes, and the machining program 3 can be created by the operator switching the display and inputting necessary parameters.

Moreover, the machining program creating device 2 includes a machining program creating unit 24 that reads out necessary parameters from the machining-condition-search-parameter input screen 22 and the integral-electrode-shape-parameter input screen 23 and creates the machining program 3 by automatically performing various calculations, and a machining condition creating unit 25 that searches a machining condition database for the machining condition data 4 based on the input on the machining-condition-search-parameter input screen 22 and outputs it.

FIG. 2 is an input screen example of the machining program creating device 2 in the first embodiment, and illustrates an input screen for an integral female threading electrode. Specifically, FIG. 2(a) is the machining-condition-search-parameter input screen 22, and FIG. 2(b) is the integral-electrode-shape-parameter input screen 23.
In the present embodiment, switching of these two screens is possible by selecting a tab portion in the upper portion.

Figure 6A:
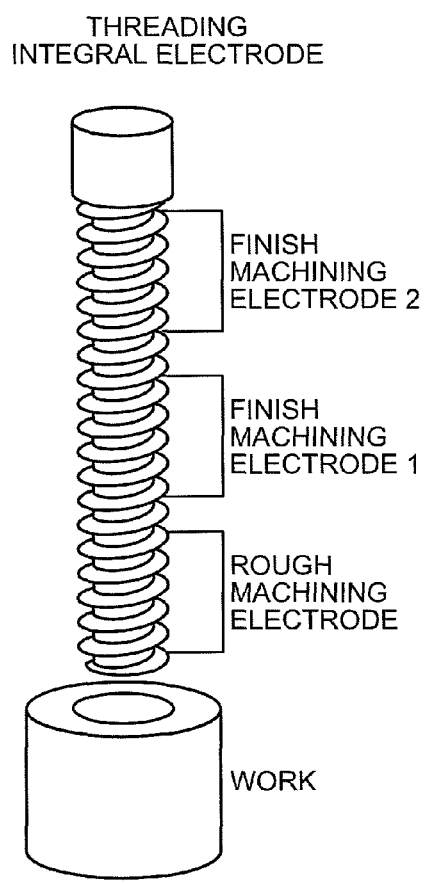
FIG. 6 is an explanatory diagram of an integral electrode.
Figure 6B:
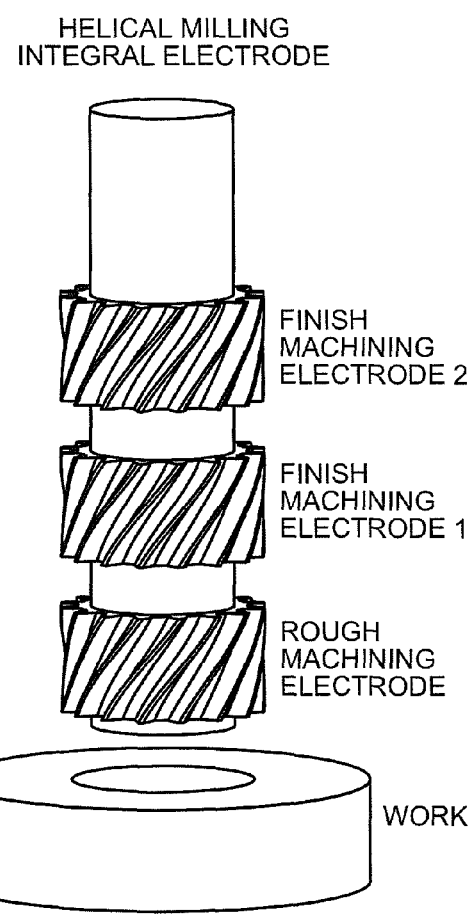

Next, explanation is given for items in each screen that the operator needs to input. The operator selects a machining method to be performed from a screen in which names (for example, threading, helical milling, and the like) of machining to a workpiece are listed on an initial screen in the machining program creating device 2 to transition the screen, whereby the machining-condition-search-parameter input screen 22 shown in FIG. 2(a) is displayed.
The operator confirms a machining content of the work 7 and the electrode 6 from a drawn conceptual diagram and inputs an electrode specification and thickness data of the workpiece, such as a material of the work 7 and the electrode 6, a work plate thickness, and a screw outer diameter, on the machining-condition-search-parameter input screen 22.
Moreover, as machining setting, desired machining setting of a bite control, a surface roughness $R_z$, a liquid treatment, and the like is made, and setting of the number of divisions of a long screw electrode for machining is made by inputting in an input item of a reduction margin for the number of divisions. Inputting the reduction margin to a third electrode indicates that machining is performed three times by the rough machining electrode, the finish machining electrode 1, and the finish machining electrode 2 using the threading integral electrode shown in FIG. 6(a).
A pilot hole diameter is input in a machining detail.
After completing the necessary parameter setting on the machining-condition-search-parameter input screen 22 in FIG. 2(a), the operator switches the tab in the screen upper portion to switch the screen to the integral-electrode-shape-parameter input screen 23 in FIG. 2(b), and inputs the parameters of the integral electrode.

Specifically, the operator inputs a pitch that is a length of a relief portion between the respective electrodes that are coaxially arranged, a Z-axis start position indicating the position from the upper surface of the work at which the electrode starts machining, and a first machining depth that defines a value to lower the electrode in the Z direction from the Z-axis start position, of the integral electrode on the integral-electrode-shape-parameter input screen 23.

Then, after inputting the necessary information from the machining-condition-search-parameter input screen 22 and the integral-electrode-shape-parameter input screen 23, the program creation is instructed, whereby the machining program similar to FIG. 7(*a*) is created.

In the actual machining operation, as the rough machining, the electrode is lowered by the first machining depth (15 mm) from a electrode start position (Z axis: 5 mm) in the Z direction and performs the electric discharge machining while rocking the electrode in a lateral direction that is separately set.

After finishing the rough machining, as the finish machining 1, the electrode is returned to the center position and is further lowered by the work plate thickness (10 mm)+the pitch (1.5 mm) in the Z direction and the first finish machining is performed while rocking the electrode in the lateral direction. The electrode is lowered in the Z direction with the pitch additionally added for surely positioning the position of the screw in an up-and-down direction.

Then, after finishing the first finish machining, the electrode is further lowered by the work plate thickness (10 mm)+the pitch (1.5 mm) in the Z direction and the second finish machining is performed while rocking the electrode in the lateral direction. In this example, because the number of the used electrodes is three, the electrode is returned to the center and is raised to an initial position (Z axis: 5 mm) in the Z direction to finish machining.

If the number of the used electrodes is larger, the finish machining is repeated.

Next, explanation is given for the machining program creation based on the input from the machining-condition-search-parameter input screen 22 and the integral-electrode-shape-parameter input screen 23 in a machining program creating unit 24 with reference to the flowchart in FIG. 3.

In accordance with the data input shown in FIG. 2 on the machining-condition-search-parameter input screen 22 and the integral-electrode-shape-parameter input screen 23 by the operator, a machining program automatic creation is started at Step S1.

The operator sets the machining content such as work material/electrode material/work plate thickness/screw outer diameter, the machining setting such as bite control/surface roughness $R_Z$/liquid treatment/rocking pattern/reduction margin, the machining detail such as the pilot hole diameter, and integral electrode information such as pitch/Z start position/first machining depth, so that the machining program creating unit determines the machining depth in the Z axis, which is conventionally determined by calculation by the operator himself/herself, based on these information and performs programming.

Specifically, because it is determined to perform the electric discharge machining three times by the data of the reduction margin, the program for the sequence number P of 1 is first created, and the Z start position input by the operator is set as the Z axis position for starting the electric discharge machining and the Z axis position of the machining depth to lower the electrode from the Z axis position at the time of machining is set (Step S2).

As the machining condition E, one that meets the condition such as the work, the electrode material, and the surface roughness is automatically selected from the database of the machining condition that is registered in advance, and as the rocking pattern D and the reduction margin R, input values by the operator are set.

Then, at Step S3, it is determined whether program sequences for the number of the used electrodes (3 in the case of the present embodiment) are calculated, and when the program sequences for the number of the used electrodes are not calculated, the process moves to Step S4, the sequence number P is incremented, and the calculation is repeatedly performed until calculating the program sequences for the number of all of the used electrodes.

For example, when the sequence number P is 2, because the position lowered by the machining depth of 15 mm from the z axis (5 mm) of the machining start is a first machining finished position, so that the position (−26.5 mm) in which the work plate thickness (10 mm) and the pitch (1.5 mm) are taken into account from the position is the machining depth in the second machining.

At Step S3, when the calculation for the program sequences for the number of all of the used electrodes is finished, at Step S5, for creating the program of the last line of the sequence number P to return the electrode for the electric discharge machining to the original position, the Z axis (5 mm) of the start position that is the coordinates of the electrode is set and the machining program 3 is created.

Then, at Step S6, the created machining program 3 is output on the program input screen, which is confirmed by the operator and is sent to the machining control unit 5 to perform the electric discharge machining by the electrode 6 and the work 7.

The machining condition creating unit 25 automatically selects one that meets the condition such as the work, the electrode material, and the surface roughness from the database of the machining condition that is registered in advance.

According to the present embodiment, the machining program creating unit 24 can perform the automatic creation while calculating the parameters necessary for the machining program creation based on various parameters set on the machining-condition-search-parameter input screen 22 and the integral-electrode-shape-parameter input screen 23.

Therefore, the operator himself/herself does not need to perform keystroke and calculation, so that an error can be avoided and the programming time can be largely reduced.

Second Embodiment

In the second embodiment, explanation is given for the helical milling in which the above integral electrode performs machining while performing a predetermined rotation around the axis of the electric discharge machining electrode, and the machining-condition-search-parameter input screen 22 and the integral-electrode-shape-parameter input screen 23 become input screens as shown in FIG. 4.

FIG. 4 is an input screen for a helical-gear female threading electrode, in which FIG. 4(*a*) is the machining-condition-search-parameter input screen 22 and FIG. 4(*b*) is the integral-electrode-shape-parameter input screen 23.

As input items different from the first embodiment, inputs of a helical angle and a helical direction are needed on the machining-condition-search-parameter input screen 22, and the integral-electrode-shape-parameter input screen 23 includes portions for inputting a length of each of a first electrode, a second electrode, and a third electrode and dimensions of relief portions 1 and 2 therebetween.

The machining-condition-search-parameter input screen 22 and the integral-electrode-shape-parameter input screen 23 are provided in advance corresponding to the shape of the electrode to be used for the electric discharge machining, and the input screen corresponding to the selection of the machining method and the machining electrode by the operator is displayed.

Input is made to the third electrode in the present embodiment; however, when using only two electrodes, this case is handled by omitting the input of the length of the third portion.

Then, after inputting the necessary information from the machining-condition-search-parameter input screen 22 and the integral-electrode-shape-parameter input screen 23, the program creation is instructed, whereby the machining program similar to FIG. 7(b) is created.

In the actual machining operation, as the rough machining, when the electrode is lowered from the start position (Z axis: 5 mm, C axis: 7.448°), the rough machining is performed to reach the machining depth (Z axis: −31.000 mm, C axis −29.781°) while simultaneously performing a constant C axis rotation that is calculated from the helical angle. At this time, the electric discharge machining is performed for the work plate thickness (10 mm); however, because the amount (10 mm) of the length of the first electrode excluding the work thickness completes the electric discharge machining to the work and the relief portion 1 (12 mm) does not have an electrode portion that contributes to the electric discharge, the electrode is lowered by performing the movement in the Z direction and the constant C axis rotation simultaneously without performing the electric discharge.

Then, with this operation, the electrode can be aligned to the position at which the first finish machining can be started, so that the first finish machining is started from this position.

After finishing the rough machining, as the finish machining 1, the machining condition is changed based on the start position (Z axis: −31 mm, C axis: −29.781°) of the finish machining, and when lowering the electrode, the finish machining 1 is performed to reach the machining depth (Z axis: −62.000 mm, C axis −77.457°) while simultaneously performing the constant C axis rotation that is calculated from the helical angle.

Then, after finishing a finish machining 2 in the similar manner, the electrode is raised to the initial position (Z axis: 5 mm) in the Z direction from the work while reversely rotating the electrode without performing machining to end the machining.

Figure 5:
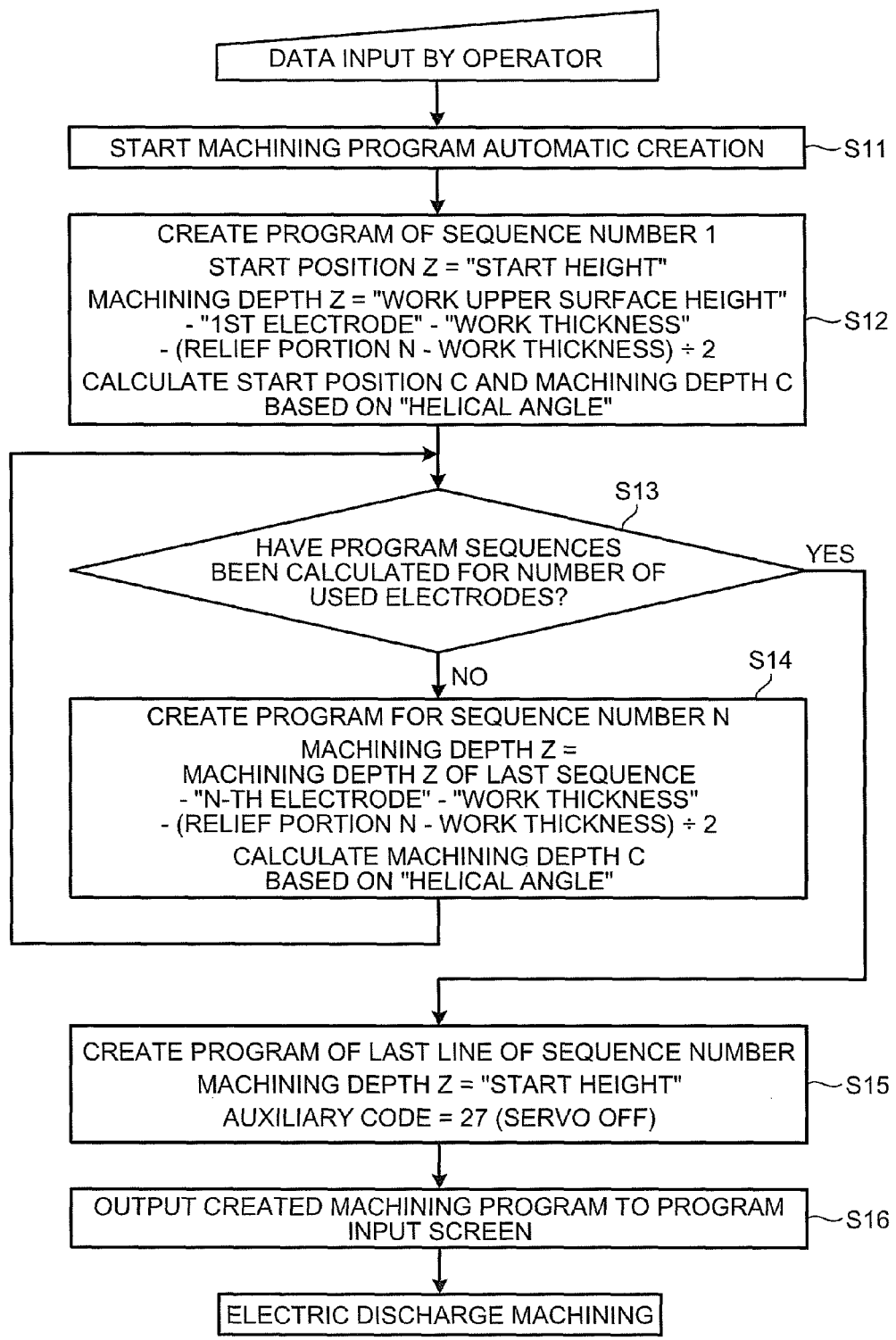
FIG. 5 is an operation flowchart in the machining program creating unit.

Next, explanation is given for the machining program creation based on the input from the machining-condition-search-parameter input screen 22 and the integral-electrode-shape-parameter input screen 23 in the machining program creating unit 24 with reference to the flowchart in FIG. 5.

In the operation explanation, portions at Steps S12, S14, and S15 that are different from the flowchart in FIG. 3 are explained, and other steps are similar to the operations in FIG. 3.

In accordance with the data input shown in FIG. 4 on the machining-condition-search-parameter input screen 22 and the integral-electrode-shape-parameter input screen 23 by the operator, the machining program automatic creation is started at Step S11.

Then, at Step S12, because it is determined to perform the electric discharge machining three times up to the third electrode by the input of the electrode information on the integral electrode, the program for the sequence number P of 1 is first created, and a start height input by the operator is set as the Z axis position for starting the electric discharge machining and also the Z axis position of the machining depth to lower the electrode at the time of machining from the Z axis position, and the start position C and the machining depth C of the C axis are set. The machining depth Z is determined by "upper surface height of work (=0.0)"−"first electrode (20 mm)"−"work thickness (10 mm)−("relief portion 1 (12 mm)"−"work thickness (10 mm)")/2, and is specifically set to "−31.000".

Moreover, the start position C and the machining depth C are set based on the operational expression such as a trigonometric function that is preset in the machining program creating unit 24 based on the helical angle(20°) and the rotation direction (CW right).

As the machining condition E, one that meets the condition such as the work, the electrode material, and the surface roughness is automatically selected from the database of the machining condition that is registered in advance, and as the rocking pattern D and the reduction margin R, input values by the operator are set.

Then, at Step S13, it is determined whether the program sequences for the number of the used electrodes (3 in the case of the present embodiment) are calculated, and when the program sequences for the number of the used electrodes are not calculated, the process moves to Step S14, the sequence number P is incremented, and the calculation is repeatedly performed until calculating the program sequences for the number of all of the used electrodes.

Then, when the calculation for the program sequences for the number of all of the used electrodes is finished, at Step S15, for creating the program of the last line of the sequence number P to return the electrode for the electric discharge machining to the original position, the auxiliary code M for returning the electrode to the original position from the work while reversely rotating the electrode without performing machining and the Z axis (5 mm) of the start position that is the coordinates of the electrode are set and the machining program 3 is created.

According to the present embodiment, the machining program creating unit 24 can perform the automatic creation while calculating the parameters necessary for the machining program creation based on various parameters set on the machining-condition-search-parameter input screen 22 and the integral-electrode-shape-parameter input screen 23.

Specifically, the program is created by automatically calculating an amount of rotation necessary for the program creation based on information such as the pitch, the helical angle, or the rotation angle per depth shown in the drawing, so that the operator himself/herself does not need to perform keystroke and calculation. Thus, an error can be avoided and the programming time can be largely reduced.

INDUSTRIAL APPLICABILITY

This invention relates to the programming device of the electric discharge machining apparatus, and is particularly capable of easily creating the electric discharge machining program using the integral electrode, which was complicated.

The invention claimed is:

1. A programming device of an electric discharge machining apparatus comprising:
a machining-method selecting unit that selects a machining method using an integral electrode in which electrodes corresponding to a plurality of machining forms are arranged coaxially;
an electrode specification input unit that inputs a length of a relief portion between the electrodes that are arranged coaxially and respective electrode specifications of the electrodes in accordance with the machining method selected by the machining-method selecting unit;

a machining content input unit that inputs thickness data of a workpiece when performing electric discharge machining on the workpiece by using the integral electrode; and a machining program creating unit that creates a machining program including a machining start position, a machining depth, and an electrode feed between the plurality of the machining forms when performing the electric discharge machining by using each of the electrodes based on the input length of the relief portion, the respective electrode specifications of the electrodes, and the thickness data of the workpiece.

2. The programming device of the electric discharge machining apparatus according to claim 1, wherein the electrode specification input unit inputs respective electrode dimensions of the electrodes and a positional relationship between the electrodes.

3. The programming device of the electric discharge machining apparatus according to claim 2, wherein when the integral electrode performs machining while performing a predetermined rotation around an axis of an electric discharge machining electrode, the length of the relief portion is input as an input value of the positional relationship between the electrodes, wherein the relief portion is between the electrodes and a diameter of the relief portion is smaller than an electrode outer diameter.

4. The programming device of the electric discharge machining apparatus according to claim 3, wherein the machining program creating unit receives input of data indicating the predetermined rotation and determines a machining direction and an amount of rotation in the relief portion between the electrodes.

5. The programming device of the electric discharge machining apparatus according to claim 2, wherein the electrode specification input unit inputs (i) rough machining and finish machining as the respective electrode specifications of the electrodes and (ii) a number of times the rough machining and the finish machining are performed in the electric discharge machining, wherein the rough machining and the finish machining are performed by using each one or more of the electrodes of the integral electrode.

6. The programming device of the electric discharge machining apparatus according to claim 3, wherein the electrode specification input unit inputs (i) rough machining and finish machining as the respective electrode specifications of the electrodes and (ii) a number of times the rough machining and the finish machining are performed in the electric discharge machining, wherein the rough machining and the finish machining are performed by using one or more of the electrodes of the integral electrode.

7. An electric discharge machining apparatus comprising:

a machining-method selecting unit that selects a machining method using an integral electrode in which electrodes corresponding to a plurality of machining forms are arranged coaxially;

an electrode specification input unit that inputs a length of a relief portion between the electrodes that are arranged coaxially and respective electrode specifications of the electrodes in accordance with the machining method selected by the machining-method selecting unit;

a machining content input unit that inputs thickness data of a workpiece when performing electric discharge machining on the workpiece by using the integral electrode;

a machining program creating unit that creates a machining program including a machining start position, a machining depth, and an electrode feed between the plurality of the machining forms when performing the electric discharge machining by using each of the electrodes based on the input length of the relief portion, the respective electrode specifications of the electrodes, and the thickness data of the workpiece; and a machining control unit that controls the electric discharge machining between the electrodes and the workpiece by using a machining condition that is prestored based on the machining program created by the machining program creating unit.

* * * * *